United States Patent Office 3,002,957
Patented Oct. 3, 1961

3,002,957
POLY-N-VINYLBUTANESULTAM
Carl John Berg, St. Paul, and Samuel Smith, Mendota Heights, Minn., assignors to Minnesota Mining and Manufacturing Company, St. Paul, Minn., a corporation of Delaware
No Drawing. Filed Sept. 15, 1958, Ser. No. 760,869
6 Claims. (Cl. 260—79.3)

The invention relates to polymeric substances, and more particularly to polyvinylbutanesultam.

Vinyl derivatives of sultams have heretofore been prepared. In German patent application DAS 1,017,614, published October 17, 1957, a process for the production of mixed N-vinylsultams is described, wherein a mixture of 1,3- and 1,4-butanesultams is vinylated under alkaline conditions using a mixture of acetylene and nitrogen and an organic solvent, and a heterogeneous product is subsequently isolated. Some cleavage of the 1,3-butanesultam may have occurred under these conditions, as it is known that the 1,3-propanesultam ring is cleaved by bases. The product, a mixture, is described as showing a strong tendency for polymerization, although further details are lacking. It has in fact been found that N-vinyl-1,4-butanesultam is sensitive to acidic reagents, by the action of which it is converted to low molecular weight oligomeric polymers. These are oily or viscous polymers which so far as is known are useless and are regarded as undesirable reaction products. The prior art fails to describe any method for the polymerization of N-vinyl-sultams to provide useful solid thermoplastic polymers.

It is an object of this invention to provide solid, useful polymers of N-vinyl-1,4-butanesultam. A further object is to provide a process for the polymerization of N-vinyl-1,4-butanesultam. Other objects will become apparent from the disclosures made hereinafter.

In accordance with the above and other objects of the invention, it has been found that useful thermoplastic solid polymers can be prepared from N-vinyl-1,4-butanesultam having the structural formula

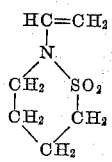

This monomer is readily prepared by the following sequence of conversions starting from ethylene:

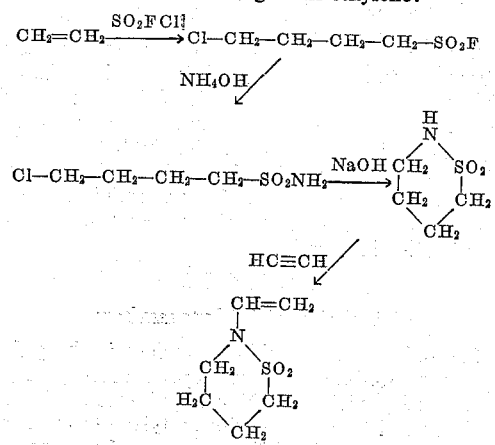

Referring to the equations, it will be seen that omega-chlorobutanesulfonyl fluoride is prepared by treating ethylene with sulfonyl chlorofluoride. This process is described and claimed in United States Patent No. 2,846,472 and it is therein noted that treatment of the chlorobutanesulfonyl fluoride thus formed with aqueous ammonia readily produces the corresponding 4-chlorobutanesulfonamide as shown in the next reaction step, which is cyclized to form 1,4-butanesultam by treatment with aqueous alkali. The sultam is vinylated by treatment with acetylene in the absence of a diluent gas.

In the vinylation step, a solution of the sultam is treated in an inert, preferably anhydrous solvent with acetylene under pressure, at elevated temperatures, and in the presence of an alkali metal salt of the sultam, which appears to act as a catalyst. Pressures of acetylene of from about 0.1 to about 10 atmospheres and temperatures in the range of about 125° to about 200° C. can be employed. Higher temperatures can also be employed but offer no apparent practical advantages. The bases which can be used to form the salt of the sultam are the strong alkalis, for example, alkali metal alkoxides such as sodium alkoxide, alkali metal hydroxides such as potassium and sodium hydroxide, and the like. Preferably, pressures of acetylene of about 5 atmospheres and a temperature of about 170° C. are used, while the alkali metal hydroxides are preferred bases. Surprisingly, even under these somewhat severely basic conditions, in the absence of any diluent gas, there appears to be no cleavage of the 1,4-butanesultam ring by the base, and good yields of N-vinyl-1,4-butanesultam are obtained.

The alkali metal salt employed as a catalyst in the vinylation process may be produced separately from stoichiometric amounts of sultam and a suitable base, or it may be produced in situ, for example, by addition of an alkali metal hydroxide to the selected sultam or a solution thereof. The alkali metal salt is recovered as such after the reaction and the sultam thus bound is consequently not to be counted in computing the yield of the reaction. For this reason, lower amounts of base, ranging from about 0.5 to 10 mole percent, are preferred although as much as 25 mole percent or even somewhat more is sometimes used with advantage.

It is found to be advantageous to employ an inert solvent in the vinylation process. Such solvents as benzene exemplify useful solvents, which do not react with the acetylene but which serve to dissolve substantial amounts thereof at the pressures and temperatures necessary.

In accordance with the objects of the invention, it has been found possible by using carefully controlled conditions and specific catalysts to produce solid poly-N-vinyl-1,4-butanesultam having useful and desirable properties. The solid polymer of the invention appears to be formed only under particular conditions and is distinctly different from the low molecular weight, oily or relatively soft and low-melting polymers heretofore observed to be produced when butanesultams are treated with acids, e.g., mineral acids, at ordinary temperatures. The term "oily polymers" as used herein is intended to include polymers which are liquid or semi-liquid or which show an appreciable tendency toward cold flow, that is, they have a softening point which in the case of acid-polymerized poly-N-vinyl-1,4-butanesultam is at a temperature below about 150° C. In contrast to this type of polymer, the solid thermoplastic poly-N-vinyl-1,4-butanesultam of the present invention does not soften and flow until heated to high temperatures, up to about 300° C. or higher.

Considered as a whole, the problem of the polymerization of N-vinyl-1,4-butanesultam is found to present unique aspects. While the sultams in general resemble sulfonamides and may in fact be considered to some extent as cyclic sulfonamides, they exhibit very different chemical behavior, compared with sulfonamides. Thus, the N-vinyl sulfonamides do not hydrolyze readily, but the N-vinyl-1,4-butanesultam monomer is easily hydrolyzed to produce the sultam and acetaldehyde, which may then recondense to give oily products. Moreover, the polymerization of N-vinyl-sulfonamides is effected in the presence of free radical catalysts as described in United States Patent No. 2,475,424, whereas high-melting thermoplastic poly-N-vinyl-1,4-butanesultams having desirable properties are not formed under these conditions. Under these conditions, N-vinyl-1,4-butanesultam may fail to react or may form only very low molecular weight polymers in low yields.

In accordance with the objects of the invention it has been found that polymerization of N-vinyl-1,4-butanesultam to useful high-melting thermoplastic polymers is brought about by the catalytic action of that class of substances best described as halogen-containing "Lewis acids." Thus, the process for the production of poly-N-vinyl-1,4-butanesultam comprises polymerizing N-vinyl-1,4-butanesultam in the presence of from about 0.003 to about 1 weight percent of a halogen-containing Lewis acid catalyst. In the preparation of poly-N-vinyl-1,4-butanesultam of numerical average molecular weight above about 5,000 to 10,000, it is preferred to employ concentrations of catalyst of about 0.003 to 0.1 weight percent. The polymerization can be terminated at any desired stage by addition of base.

Useful catalysts which are typical of halogen-containing Lewis acids useful in the polymerization process are exemplified by boron trifluoride etherate, aluminum chloride, stannic chloride, zinc chloride, zirconium tetrachloride, vanadium oxychloride, aluminum bromide and the like. It will be apparent that these substances are not acids in the ordinary sense of the word.

The temperatures employed in polymerization can range from about −100° to about 0° C. For example, N-vinyl-1,4-butanesultam is readily polymerized using less than 0.1 percent by weight of borontrifluoride etherate at temperature as low as −90° C. In general, lower temperatures are preferred since at temperatures upward of −20° C. the polymerization is less readily controlled. Polymerization of N-vinyl-1,4-butanesultam by the process of this invention provides a series of useful polymers comprising a multiplicity of recurring units having the structure:

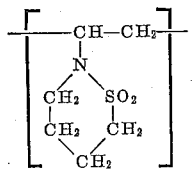

Solid, thermoplastic polyvinyl-1,4-butanesultam has a softening point above about 300° C., is substantially insoluble in water, ethanol, acetone and toluene and shows appreciable solubility in concentrated hydrochloric acid, concentrated sulfuric acid, acetic acid, dimethyl formamide, nitroethane, methylene chloride and ethylene chloride. So far as is presently known, the polymers of the invention are not crystalline, in the form produced by the process of the invention. Clear, transparent films of a polyvinyl butanesultam can be formed by casting from solution, for example, using a solution of the polymer in an appropriate solvent, e.g. ethylene chloride. Films of poly-N-vinyl-1,4-butanesultam are flexible, and are unaffected by 40 percent aqueous sodium hydroxide. It is found that polyvinylbutanesultam having an inherent viscosity above about 0.1 (in dimethylformamide solution) which appears to correspond to a number average molecular weight of about 2500° that is, about 15 recurring units, forms useful supported films (such as coatings) and when the inherent viscosity in dimethylformamide is above about 0.4, which appears to correspond to a number average molecular weight of about 20,000 (upwards of 100 recurring units), useful self-sustaining films and molded objects are readily formed therefrom.

The polymer is recovered from its solutions in concentrated acids by dilution with water, and is unchanged in properties thereby. This behavior is surprising in view of the ready cleavage of the monomer by dilute acids. The thermal properties of poly-N-vinyl-1,4-butanesultam with respect to resistance to high temperatures are of especial interest, for example, in providing coatings for metal or wood and in molded articles for electrical systems of automobiles and aircraft, since, although thermoplastic, it remains resistant to mechanical disruption of the surface even at temperatures of the order of about 180° C. The polymers of the invention can also serve in various applications as release coatings, for example, on the surface of molds.

The following examples serve to illustrate the best mode contemplated of practicing the present invention, without limiting the scope thereof. In these examples all parts are by weight unless otherwise specified and inherent viscosities are determined by standard procedures.

EXAMPLE 1

*Preparation of 1,4-butanesultam*

A mixture of 28 parts of ethylene, 43 parts of sulfuryl chlorofluoride, 2 parts of azo-bis-isobutyronitrile and 20 parts of benzene is heated in an autoclave at about 80° C. under 1000 p.s.i. pressure for about 2 hours. The reaction mixture is then fractionally distilled at 10 mm. Hg pressure, yielding 4-chlorobutanesulfonyl fluoride as the fraction boiling at about 110° C.

A mixture of 52.7 parts of 4-chlorobutanesulfonyl fluoride and 400 parts of 20 percent aqueous ammonium hydroxide is heated at 35° to 40° C. for about 4 hours with good agitation, followed by rapid evaporation under reduced pressure, whereby a residue consisting mainly of 4-chlorobutanesulfonamide (melting at about 49° C.) and some 1,4-butanesultam (melting at about 111° C.) is obtained. The products can be separated by fractional distillation below 1 mm. Hg. pressure.

A vessel adapted for heating and agitation is charged with 500 parts of 2 percent aqueous sodium hydroxide and 21.2 parts of 4-chlorobutanesulfonamide are added and dissolved therein. The solution is heated at about 50° C. for 17 hours and then evaporated under reduced pressure to about 5 to 10 percent of its original volume. The concentrated solution is treated with an excess of carbon dioxide to neutralize any remaining base and then is evaporated to dryness. The residual white cake is broken up and extracted with three successive 150 part portions of isopropanol, the insoluble residue being discarded after the last extraction. The total extract is concentrated to small volume and chilled. A crystalline precipitate of 1,4-butanesultam forms on standing and is collected by filtration and dried. The mother liquors are further evaporated and chilled, and the resulting precipitate is recovered. This process is repeated and the crystalline materials obtained from all of the crystallizations are combined. The yield of 1,4-butanesultam is substantially quantitative. It is found that both the amidation reaction of the sulfonyl fluoride and the ring closure of the chlorosulfonamide proceed more satisfactorily with respect to yield and purity at relatively low concentrations of alkali as herein described.

EXAMPLE 2

*Vinylation of 1,4-butanesultam*

A 316-stainless-steel rocking autoclave is charged with 5.0 parts of 1,4-butanesultam, 2 parts of reagent grade potassium hydroxide and 100 parts of water. The autoclave is flushed three times with acetylene to remove air, by filling to 100 p.s.i. with acetylene and venting. The autoclave is then charged with acetylene at 80 p.s.i. at room temperature, and sealed. Rocking and heating are commenced. The pressure at 143° C. is 198 p.s.i. which drops after 2 hours to about 180 p.s.i., while the temperature is maintained at about 150° C. during that period. The autoclave is thereafter allowed to cool to room temperature, pressure is released and the reaction mixture is removed. The reaction mixture consists of an aqueous phase and an oily organic phase. Ether is employed (4 successive portions of 20 parts each) to dissolve and extract the desired reaction product from the aqueous alkali. Concentration of the extracted aqueous layer and neutralization, followed by evaporation to dryness, give a residue from which 3⅓ parts of unreacted 1,4-butanesultam are recovered by extraction of the residue with hot isopropyl alcohol and crystallization.

The ethereal extracts, including some reddish oil, which is believed to result from hydrolysis of the vinylated sultam, followed by condensation of acetaldehyde thus formed, are combined and evaporated to give grossly impure N-vinyl-1,4-butanesultam, which is purified by distillation, and is found to boil at about 72° C. at 0.05 mm. of mercury pressure. There is obtained N-vinyl-1,4-butanesultam, a colorless somewhat viscous liquid having $n_D^{25} = 1.5051$ which crystallizes slowly on chilling and then melts at about 28° C.

Calculated for $C_6H_{11}O_2SN$: C, 44.6 percent; H, 6.8 percent; N, 8.7 percent. Found: C, 45.3 percent; H, 6.8 percent; N, 8.5 percent.

EXAMPLE 3

In a preferred vinylation procedure in which a non-aqueous solvent is employed, a mixture of 34.7 parts (0.257 moles) of 1,4-butanesultam, 3.0 parts of solid potassium hydroxide pellets and 132 parts of purified benzene is heated in an autoclave at 180° C. under 200 p.s.i. combined pressure of benzene vapor and acetylene gas, further acetylene being introduced until the pressure remains substantially constant on continued heating. It is found that contamination of the autoclave may markedly hamper this reaction and scrupulous care is therefore necessary to be sure that the autoclave is conditioned as, for example, by a series of runs from which starting material is reclaimed. Uptake of acetylene is complete after about 5 hours, the autoclave is cooled to 25° C. and residual acetylene discharged. The resultant substantially colorless benzene solution containing the reaction product, consisting essentially of N-vinyl-1,4-butanesultam, is decanted from an amount of residual solids including the potassium salt of 1,4-butanesultam. The residue is washed with ether; and the benzene solution and ether washings are combined. Evaporation of this mixture yields a residue of N-vinyl-1,4-butanesultam which is crystallized from about an equal weight of anhydrous ether at about 0° C. The crystalline mass is broken up and rinsed with cold anhydrous ether and then dried under about 0.1 mm. Hg pressure for 3 hours. The white crystalline N-vinyl-1,4-butanesultam thus obtained melts at about 29.5° C.

EXAMPLE 4

Polymerization of N-vinyl-1,4-butanesultam

A solution of 5 parts of N-vinyl-1,4-butanesultam (previously purified by distillation in vacuo, followed by dissolving it in 1:1 benzene-hexane, passing this solution over a chromatographic column of basic Brockman alumina, evaporating the solvent and recrystallizing the residue from ether) in 10 parts of methylene chloride (previously purified by distillation after shaking with concentrated sulfuric acid) is cooled to about −40° in a glass vessel provided with a stirrer and sealed from atmospheric moisture. About 0.03 part (about 0.7 mole percent based on monomer) of borontrifluoride etherate in about 1.2 parts of toluene is added thereto in portions during a period of 3.5 hours. Moisture should be excluded, since even minute amounts of water are sufficient to inactivate low concentrations of catalyst. Inasmuch as polymerization occurs rapidly and exothermically, efficient cooling is necessary. After the addition of the catalyst is complete, and polymerization has reached the desired point, as shown for example by increase of viscosity to a point where mechanical stirring is very difficult, the catalyst is destroyed by working 0.5 part of about 30 percent aqueous ammonium hydroxide diluted with 2 parts of methanol into the still cold polymerization mixture. It is noted that if the polymerization mixture is permitted to become warm, say to about room temperature or higher, before destruction of the catalyst, depolymerization tends to take place resulting in lowered yields or poor quality of the polymer.

The polymer is isolated by transferring the contents of the reaction vessel into about 100 parts of methanol, thereby precipitating the white poly-N-vinyl-1,4-butanesultam as a filterable solid. A cake of solid poly-N-vinyl-1,4-butanesultam is thus obtained in better than 80 percent yield. The poly-N-vinyl-1,4-butanesultam thus prepared is a white, amorphous solid and has an inherent viscosity of 0.12 at a concentration of 1.88 g. in 100 ml. of dimethylformamide. The softening temperature of the polymer is about 300° C.

Other solvents which can be employed instead of methylene chloride in the polymerization process, when rigorously purified and dried, include toluene, nitroethane, chlorobenzene, ethyl chloride and ethylene dichloride. It will be evident that many other substances which are chemically inert liquid solvents for the monomer and catalyst at the selected polymerization temperature will also be suitable. It is found that polymerization may occur in some instances at temperatures up to about 25° C., but as hereinabove noted polymerization at these temperatures is less controllable and it is preferable to operate at temperatures in the range of about 0° to about −100° C.

The boron trifluoride employed above as the catalyst for the polymerization is a relatively strong Lewis acid. Aluminum chloride and stannic chloride are other examples of Lewis acids of the type useful in the polymerization process of the invention. Stannic chloride, which is considered a relatively weak Lewis acid, is particularly suitable for use in the polymerization process of the invention in that it generally gives higher yields of polymer of relatively high inherent viscosity.

EXAMPLE 5

In a rigorously cleaned and dried glass container provided with a glass-covered magnetic stirring bar are placed 15 parts of carefully purified methylene chloride and 10 parts of N-vinyl-1,4-butanesultam recrystallized from anhydrous ether. A dry oxygen-free atmosphere of nitrogen is maintained over the reactants during polymerization. The solution is cooled to −75° C. and 0.0037 part (0.0023 mole percent) of anhydrous stannic chloride dissolved in about 0.1 part of methylene chloride is added with stirring. Polymerization commences at once and is permitted to proceed at −75° C. for about 4 hours. Polymerization is terminated at this point by working about 35 parts of cold (about −70° C.) methylene chloride (previously rendered basic by shaking with 28 percent ammonium hydroxide) into the cold (about −70° C.) reaction mixture and the substantially homogeneous solution which contains the polyvinylbutanesultam formed in the process is added to about 500 parts of methanol. A white precipitate of poly-N-vinyl-1,4-butanesultam forms and is collected, washed with methanol and dried at 60° C. at 25 mm. Hg pressure for about 2 hours. It has an inherent viscosity of 1.02 at a concentration of 0.50 g. in 100 ml. of methylene chloride.

EXAMPLE 6

The poly-N-vinyl-1,4-butanesultam of Example 5 is dissolved in ethylene chloride to give a solution of about 5 percent by weight of polymer, and a film is cast therefrom on an ordinary aluminum surface which has not been specially cleaned or treated. The film is permitted to dry for about 16 hours with exclusion of dust and strong air currents. A transparent, colorless film is formed which is about 2 to 5 mils thick and which can be stripped from the metal surface in one piece. The film is found to be self-sustaining and fairly flexible, and has a tensile strength of about 5100 p.s.i., dielectric constants at 1 kc. and 100 kc. of about 2.72 and a dielectric strength of about 300 to 500 volts per mil.

When a solution of about 5 percent by weight of the above poly-N-vinyl-1,4-butanesultam in ethylene chloride is applied as a thin layer to surfaces of aluminum, steel, copper and glass which have been cleaned to remove any adherent waxy or oily material and is then dried, a water-repellent, conforming, adherent surface coating is obtained which is not dissolved by aqueous alkalies. For example, an aluminum sheet is thoroughly washed with ethylene dichloride and coated with the polymer solution. After evaporation of the solvent, the sheet is found to be protected from alkaline attack by an adherent film of polyvinylbutanesultam. The coating is somewhat fractured by deformation of the aluminum but does not appear to flake off or spall. When an aluminum mold thus protected by a film of polyvinylbutanesultam about 0.2 mil thick is employed for casting and curing at an elevated temperature a solid object composed of a conventional epoxy resin, it is found that the casting is readily separable from the mold. When this procedure is repeated using an uncoated mold, it is found that the cured epoxy resin adheres tenaciously. The coating of poly-vinyl-1,4-butanesultam is thus found to be a valuable release coating for use with epoxy resins.

EXAMPLE 7

In a flame-dried vessel fitted with stirrer, nitrogen inlet tube through which a stream of dry nitrogen is passing, thermometer and a cold-finger are placed 24.8 parts of N-vinyl-1,4-butanesultam and 69 parts of dry toluene. The vessel is chilled and then permitted to warm to −25° C. at which temperature there is a clear solution. To the solution maintained at −25° C. is added about 1.0 part of a 2.5 percent solution of boron-trifluoride etherate in toluene in three approximately equal portions during 20 minutes. When the last portion is added the temperature of the reaction mixture rises rapidly to about −9° C. and then subsides again to −25° C. and is maintained there for a further 2 hours. Polymerization is terminated by adding a solution of about 1 part concentrated ammonium hydroxide solution in about 15 parts of methanol to the cold slurry of polymer in toluene, to destroy the catalyst. The slurry is then poured into about 200 parts of methanol and the precipitated poly-N-vinyl-1,4-butanesultam is collected, washed with toluene and dried under reduced pressure at 50° C. The white powdery poly-N-vinyl-1,4-butanesultam has an inherent viscosity of 0.13 in dimethylformamide, softens above 300° C., and forms clear films on casting from solution. The above polymer and that produced in Example 4 are insoluble in water, ethanol and toluene, very slightly soluble in acetone, and soluble in ethylene dichloride. They are employed for release coatings as described in Example 6.

What is claimed is:
1. Solid high-melting thermoplastic poly-N-vinyl-1,4-butanesultam melting at about 300° C.
2. A process for the production of solid thermoplastic poly-N-vinyl-1,4-butanesultam melting at about 300° C., which comprises polymerizing N-vinyl-1,4-butanesultam under substantially anhydrous conditions in the presence of a catalytic amount of a halide anion-containing Lewis acid polymerization catalyst and at a temperature in the range of about −100° C. to 0° C.
3. A process for the production of solid thermoplastic poly-N-vinyl-1,4-butanesultam melting at about 300° C., which comprises polymerizing N-vinyl-1,4-butanesultam under substantially anhydrous conditions in the presence of a catalytic amount of borontrifluoride etherate and at a temperature in the range of about −100° C. to 0° C.
4. A process for the production of solid thermoplastic poly-N-vinyl-1,4-butanesultams melting at about 300° C., which comprises polymerizing N-vinyl-1,4-butanesultam represented by the formula:

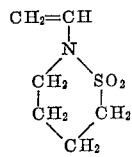

in the presence of from about 0.003 to about 1 percent of a halide anion-containing Lewis acid polymerization catalyst selected from the group consisting of borontrifluoride etherate, aluminum chloride, stannic chloride, zinc chloride, zirconium tetrachloride, vanadium oxychloride and aluminum bromide at a temperature in the range of about −100° C. to 0° C. and under substantially anhydrous conditions.
5. A process for the production of solid, thermoplastic poly-N-vinyl-1,4-butanesultam melting at about 300° C., which comprises polymerizing N-vinyl-1,4-butanesultam under substantially anhydrous conditions in the presence of from about 0.003 to about 1 weight percent of a halide anion-containing Lewis acid polymerization catalyst at a temperature in the range of about −100° C. to 0° C. and terminating polymerization by addition of a base at about the polymerization temperature.
6. A process for the production of solid, thermoplastic poly-N-vinyl-1,4-butanesultam melting at about 300° C., which comprises polymerizing N-vinyl-1,4-butanesultam under substantially anhydrous conditions at a temperature in the range of about −100° to about 0° C. and in the presence of from about 0.003 to about 0.1 weight percent of anhydrous stannic chloride catalyst, and terminating the polymerization by addition of a base at about the polymerization temperature.

References Cited in the file of this patent
UNITED STATES PATENTS
2,709,707     Park _____ May 31, 1955